(12) United States Patent
Tsukagoshi et al.

(10) Patent No.: US 7,304,774 B2
(45) Date of Patent: Dec. 4, 2007

(54) HOLOGRAPHIC RECORDING MEDIUM

(75) Inventors: Takuya Tsukagoshi, Sagamihara (JP); Tetsuro Mizushima, Moriguchi (JP); Jiro Yoshinari, Tokyo (JP); Hideaki Miura, Tokyo (JP)

(73) Assignee: TDK Corporation, Tokyo (JP)

( * ) Notice: Subject to any disclaimer, the term of this patent is extended or adjusted under 35 U.S.C. 154(b) by 12 days.

(21) Appl. No.: 10/584,130

(22) PCT Filed: Dec. 20, 2004

(86) PCT No.: PCT/JP2004/019042

§ 371 (c)(1),
(2), (4) Date: Jun. 23, 2006

(87) PCT Pub. No.: WO2005/066721

PCT Pub. Date: Jul. 21, 2005

(65) Prior Publication Data

US 2007/0146839 A1      Jun. 28, 2007

(30) Foreign Application Priority Data

Jan. 7, 2004   (JP)   .............................. 2004-001957

(51) Int. Cl.
    *G03H 1/02* (2006.01)
(52) U.S. Cl. ................ 359/3; 430/1; 369/103
(58) Field of Classification Search ................ 359/3–7; 430/1, 2; 369/103
    See application file for complete search history.

(56) References Cited

U.S. PATENT DOCUMENTS 4,908,285 A      3/1990  Kushibiki et al.
2004/0264356 A1*  12/2004  Chen et al. .............. 369/275.2

FOREIGN PATENT DOCUMENTS

EP      0291928 A2 *  11/1988
JP      A 63-287877   11/1988
JP      A 63-287878   11/1988
JP      A 7-181876    7/1995

* cited by examiner

*Primary Examiner*—Leonidas Boutsikaris
(74) *Attorney, Agent, or Firm*—Oliff & Berridge, PLC

(57) ABSTRACT

A holographic recording medium 10 includes: a recording layer 12; two substrates 14 and 16 sandwiching the same; and a photosensitive protective layer 18 covering these recording layer 12 and substrates 14 and 16 entirely. The recording layer 12 is set so that its photosensitivity corresponding to a recording wavelength falls in the vicinity of the recording wavelength from shorter wavelengths to longer wavelengths. The photosensitive protective layer 18 is set so that its light transmittance corresponding to the recording wavelength falls in the vicinity of the recording wavelength from longer wavelengths to shorter wavelengths. This improves damage of the recording layer from ambient exposure without a drop in recording sensitivity.

16 Claims, 5 Drawing Sheets

(Recording and reproduction wavelength)

Absorbance (extinction) of polymerization initiator (CIBA specialty chemicals)

HOLOGRAPHIC RECORDING MEDIUM

TECHNICAL FIELD

This invention relates to a holographic recording medium to be irradiated with an object beam and a reference beam so that information is recorded in the form of interference fringes therebetween.

BACKGROUND ART

Among conventional recording materials used for the recording layer of such a holographic recording medium as mentioned above are rewritable ones including photorefractive materials and write-once types including photopolymers.

With the latter write-once type recording materials, certain photosensitive components are consumed irreversibly by recording (exposure). The entire recording medium must therefore be prevented from exposure to light in external environment (ambient exposure) until the recording completes.

This requires, for example, that the recording be performed in an environment with little radiation of light at exposure wavelengths, or that a cartridge or the like having an excellent shielding property be used for protection.

In an environment with no radiation of light at exposure wavelengths, and with recording beams of visible light in particular, there is the problem that the recording must be performed in a darkroom and thus is unrealistic for a recording medium intended for storage systems.

The cartridge or other protection facilitates transportation, storage, and recording under normal environment, whereas the recording medium and system may get complicated in structure. In particular, this requires an openable and closable window for allowing passage of the light beams for recording and reproduction, aside from cost for providing the cartridge. Ambient exposure also occurs while the window is opened during recording. Moreover, depending on the physical relationship between the window and the recording layer, the angles of incidence, the positions of incidence, and the like of the beams are limited with a drop in the degree of freedom of the optical design. Furthermore, there is another problem of requiring a mechanical or electrical control mechanism for opening and closing the above-mentioned window in addition to the configuration necessary for ordinary recording and reproduction, with an increased size or cost of the recording medium.

As measures against the foregoing problems, it has been proposed to improve the optical characteristics of the photosensitive materials as described in Japanese Patent Laid-Open Publication No. Hei 7-181876.

This will not produce any essential improvement, however, since the recording mechanism and the shelf life of the data storage both are photochemical processes. More specifically, there is a trade-off such that the recording materials can be improved in recording sensitivity with a decrease in shelf life while damage from ambient exposure can be remedied with a drop in recording sensitivity.

A problem to be solved by this invention is to improve the trade-off between the recording sensitivity and the shelf life, and improve the shelf life of a recording medium that has an excellent recording sensitivity.

DISCLOSURE OF THE INVENTION

The inventor has found that the foregoing trade-off can be improved by selectively blocking the light in the range of exposure wavelengths with a wavelength-selective film or the like.

In summary, the above-described objectives are achieved by the following embodiments of the present invention.

(1) A holographic recording medium comprising a recording layer, the recording layer being irradiated with an object beam and a reference beam of the same recording wavelength so that information is recorded in the form of interference fringes, wherein: the recording layer is covered with a photosensitive protective layer; the recording layer is formed so that photosensitivity of its material to incident light falls in the vicinity of the recording wavelength from shorter wavelengths to longer wavelengths; and the photosensitive protective layer is formed so that its light transmittance to the incident light falls in the vicinity of the recording wavelength from longer wavelengths to shorter wavelengths.

(2) The holographic recording medium according to (1), wherein the photosensitive protective layer is set so that it absorbs or reflects light at least in a range of shorter wavelengths out of ranges of longer wavelengths and shorter wavelengths than a certain range of wavelengths across the recording wavelength, and transmits light in the certain range of wavelengths selectively.

(3) The holographic recording medium according to (1) or (2), wherein the photosensitive protective layer is made of two substrates for sandwiching the recording layer, and an end seal for covering peripheral ends of the recording layer between the two substrates and peripheral ends of the two substrates.

(4) The holographic recording medium according to (1) or (2), wherein the photosensitive protective layer is made of two substrates for sandwiching the recording layer, and an end seal for covering peripheral ends of the recording layer between the two substrates.

(5) The holographic recording medium according to (1) or (2), wherein: the recording layer is sandwiched between two substrates; and the photosensitive protective layer is formed to cover the recording layer and the two substrates.

(6) The holographic recording medium according to (3) or (4), wherein the photosensitive protective layer has an adhesive function when attaching the recording layer to the substrates, and has a light-absorbing material dispersed into its material, the light-absorbing material absorbing or reflecting light at least in the range of shorter wavelengths out of the ranges of longer wavelengths and shorter wavelengths than the certain range of wavelengths across the recording wavelength.

(7) The holographic recording medium according to (3) or (4), wherein the two substrates are made of optical glass plates formed by dispersion, into an optical glass material, a light-absorbing material for absorbing or reflecting light at least in the range of shorter wavelengths out of the ranges of longer wavelengths and shorter wavelengths than the certain range of wavelengths across the recording wavelength, and transmitting light in the certain range of wavelengths selectively.

BEST MODE FOR CARRYING OUT THE INVENTION

A holographic recording medium has a recording layer covered with a photosensitive protective layer, wherein: the recording layer is formed so that the photosensitivity of its material corresponding to a recording wavelength rises sharply in the vicinity of the recording wavelength from shorter wavelengths to longer wavelengths; and the photosensitive protective layer is formed so that its light transmittance corresponding to the recording wavelength falls sharply in the vicinity of the recording wavelength from longer wavelengths to shorter wavelengths. The recording layer is sandwiched between two substrates, and the photosensitive protective layer covers these two substrates and the recording layer as well. The foregoing object is achieved by this configuration.

First Embodiment

Figure 1:
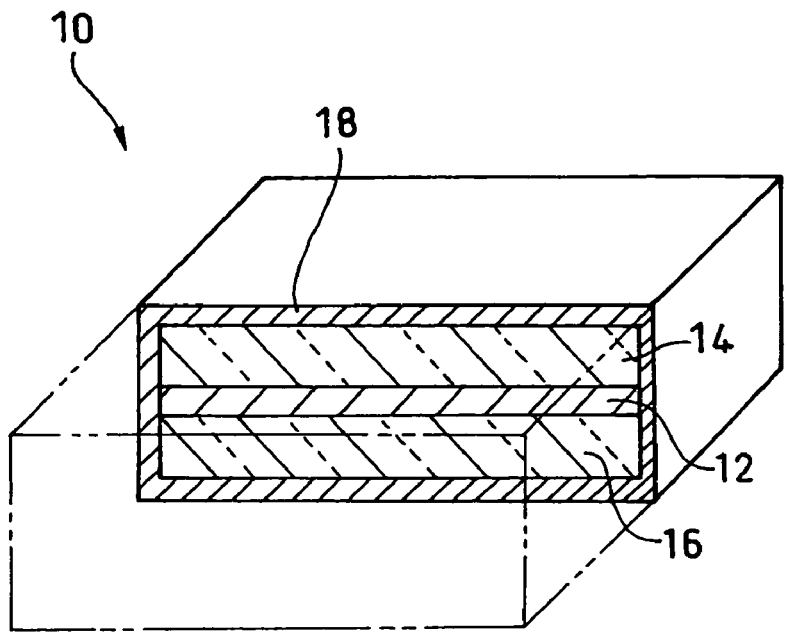
FIG. 1 is a partially sectioned perspective view showing a holographic recording medium according to a first embodiment of the present invention.

Hereinafter, a holographic recording medium 10 according to a first embodiment of the present invention will be described with reference to FIG. 1.

This holographic recording medium 10 is configured to include: a recording layer 12; two substrates 14 and 16 which sandwich this recording layer 12; and a photosensitive protective layer 18 which covers the entire outer periphery of the substrates 14 and 16 with the recording layer 12 sandwiched therebetween.

In this holographic recording medium 10, the recording layer 12 is irradiated with an object beam and a reference beam having the same wavelength simultaneously, so that information is recorded in the form of interference fringes therebetween.

Figure 2:
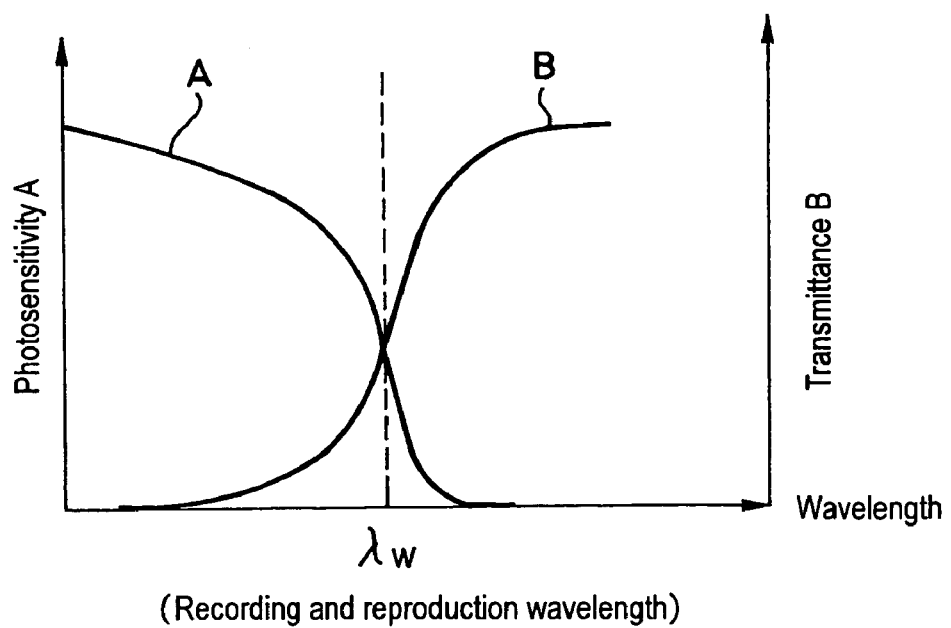
FIG. 2 is a diagram showing the relationship between the photosensitivity of a recording layer and the transmittance of a photosensitive protective layer according to the same first embodiment, in relation to a recording and reproduction wavelength.

As shown by the symbol A in FIG. 2, the material of the recording layer 12 is set so that its photosensitivity to the incident light drops sharply in the vicinity of a recording (reproduction) wavelength $\lambda w$ from shorter wavelengths to longer wavelengths.

Moreover, the photosensitive protective layer 18 is set so that its light transmittance to the incident light falls sharply in the vicinity of the recording wavelength $\lambda w$ from longer wavelengths to shorter wavelengths.

Among specific materials of the recording layer 12 are ones that cause a microscopic refractive index modulation when exposed to beams having the recording wavelength of $\lambda w$. A photopolymer is typically used.

This photopolymer contains a photo-polymerization monomer, a photo-polymerization initiator, and a binder, as main components. A heat-polymerization inhibiter and a visible light sensitizing dye may also be included if necessary.

It is preferable that the photosensitive protective layer 18 does not transmit light in the ranges of shorter wavelengths and longer wavelengths than the recording wavelength $\lambda w$. What is essentially required, however, is that at least the light of shorter wavelengths than the recording wavelength be not transmitted. The light of longer wavelengths may be transmitted.

Figure 3:
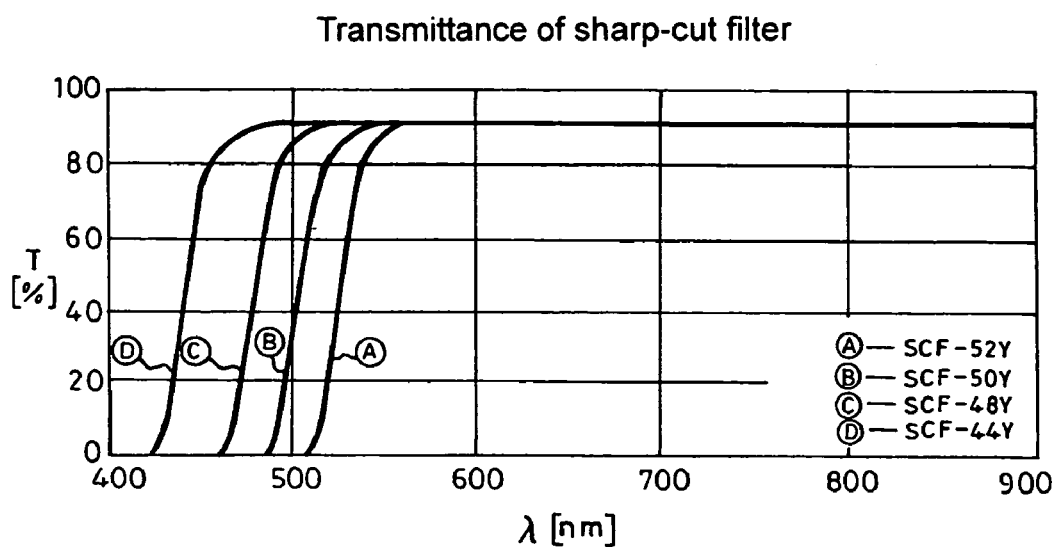
FIG. 3 is a diagram showing the transmittances of sharp-cut filters used as the photosensitive protective layer of the first embodiment, in relation to wavelength.

Moreover, among specific materials of the photosensitive protective layer 18 are sharp-cut filters (or color filters) that exhibit optical characteristics such as shown in FIG. 3. More specifically, for example, SCF-52Y, SCF-50Y, SCF-48Y, and SCF-44Y from Sigma Koki Co., Ltd. are used.

These sharp-cut filters are made of optical glass into which light-absorbing substances are dispersed, so that they only transmit light having wavelengths longer than a certain wavelength. The recording wavelength $\lambda w$ is set as the certain wavelength.

The holographic recording medium 10 according to this first embodiment has the recording layer 12 which is covered with the photosensitive protective layer 18. The photosensitive protective layer 18 has such light transmittances as block ambient light having wavelengths shorter than the recording and reproduction wavelength $\lambda w$. The recording layer 12 has no photosensitivity to light having wavelengths longer than the recording and reproduction wavelength $\lambda w$. This makes it possible to suppress ambient exposure of the recording layer 12.

Moreover, the light having the wavelength of $\lambda w$ at recording time or reproduction time can be transmitted through the photosensitive protective layer 18 without trouble in recording and reproduction.

Second Embodiment

Next, a second embodiment will be described with reference to FIG. 4.

Figure 4:
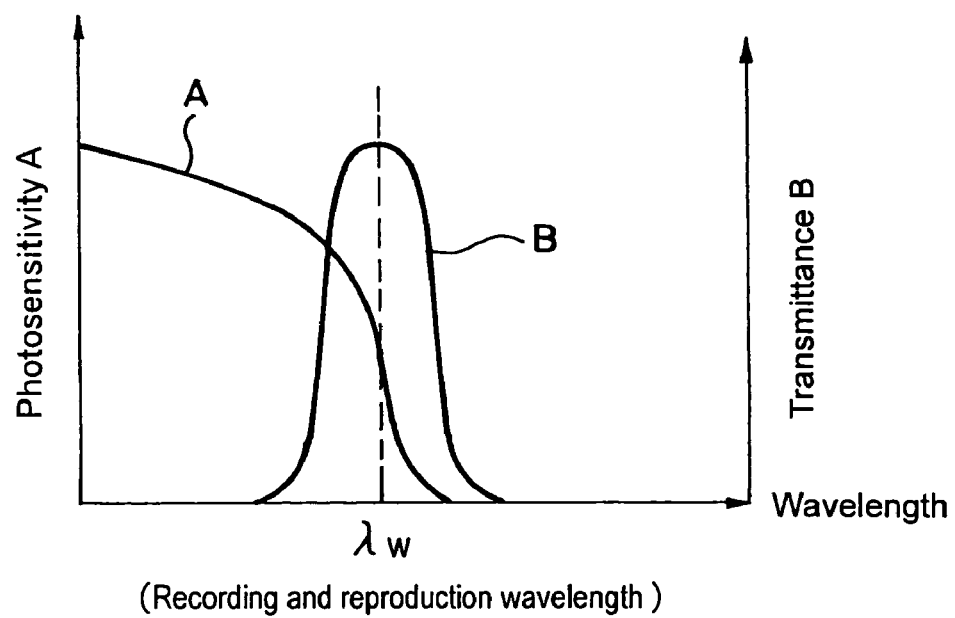
FIG. 4 is a diagram showing the transmittance of a photosensitive protective layer and the photosensitivity of a recording layer according to a second embodiment, in relation to a recording and reproduction wavelength.

The photosensitive protective layer 18 in this embodiment is designed to have such optical characteristics as shown by the symbol B in FIG. 4, so that it only transmits light in a certain range of wavelengths across the recording (reproduction) wavelength $\lambda w$.

Even in this second embodiment, as in the foregoing first embodiment, the photosensitive protective layer 18 can protect the recording layer 12 from exposure to ambient light without disturbing the recording and reproduction.

In the foregoing first embodiment, the photosensitive protective layer 18 has been formed to cover entirely the recording layer 12 and the two substrates 14 and 16 sandwiching the same. Nevertheless, the present invention is not limited thereto, but may have such configurations as shown in third to fifth embodiments.

Third Embodiment

Figure 5:
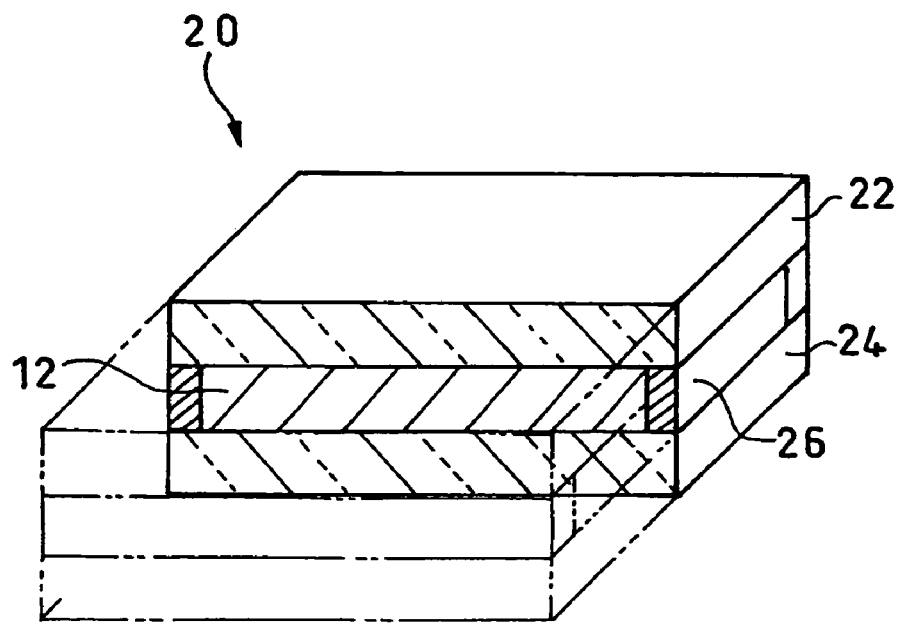
FIG. 5 is a partially sectioned perspective view showing a holographic recording medium according to a third embodiment.

As shown in FIG. 5, a holographic recording medium 20 according to the third embodiment is one in which two substrates 22 and 24 for sandwiching the recording layer 12 also serve as a photosensitive protective layer.

The two substrates 22 and 24 are made of optical glass plates which are formed by dispersing, into an optical glass material, a light-absorbing material that absorbs light at least in the range of shorter wavelengths out of the ranges of longer wavelengths and shorter wavelengths than a certain range of wavelengths across the recording wavelength $\lambda w$ and transmits the light in the certain range of wavelengths selectively.

With respect to the recording layer 12, the substrates 22 and 24 are given a size such that they protrude from the peripheral ends of the recording layer 12. The gap between the two is filled with an end seal 26, so that this end seal 26 and the substrates 22 and 24 form a photosensitive protective layer.

Here, the end seal 26 may be made of the same material as that of the photosensitive protective layer 18, or a material that fully blocks light since it does not transmit the recording beams (beams having the recording wavelength $\lambda w$).

Fourth Embodiment

Figure 6:
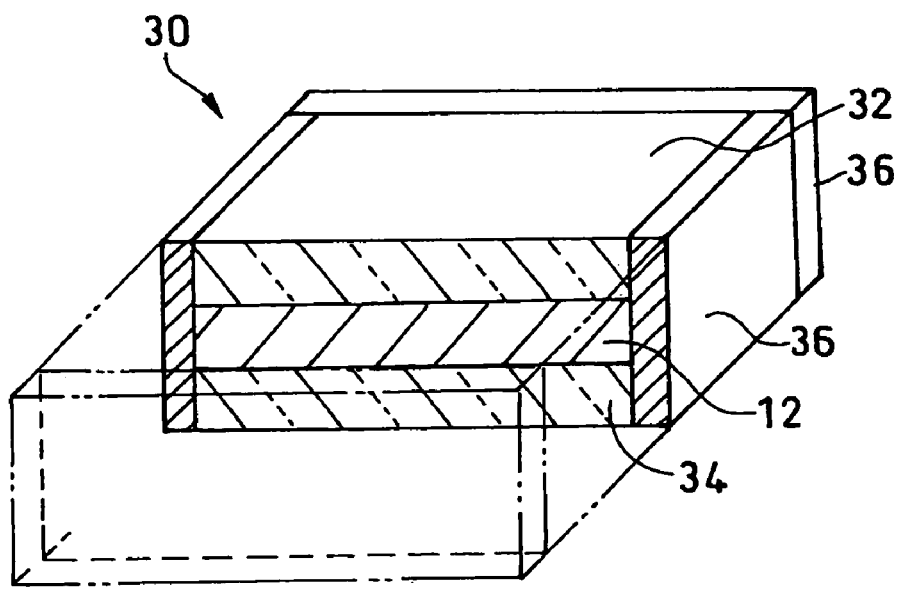
FIG. 6 is a partially sectioned perspective view showing a holographic recording medium according to a fourth embodiment.

As shown in FIG. 6, a holographic recording medium 30 of the fourth embodiment is one in which substrates 32 and 34 for sandwiching the recording layer 12 are given the same size as that of the recording layer 12, and the peripheral sides (four sides) of the recording layer 12 and the substrates 32 and 34 with the recording layer 12 therebetween are covered with an end seal 36.

The substrates 32 and 34 and the end seal 36 are made of the same materials as those of the substrates 22 and 24 and the end seal 26 of the third embodiment shown in FIG. 5 above.

Fifth Embodiment

Figure 7:
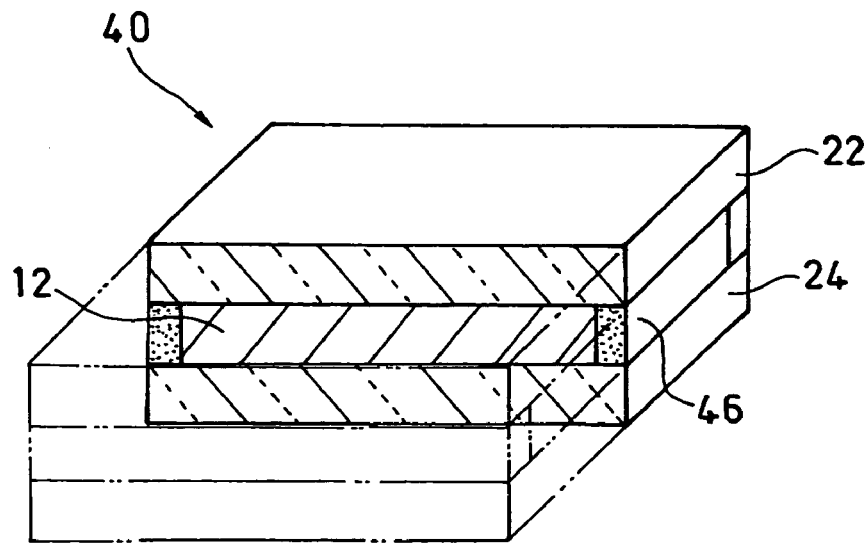
FIG. 7 is a partially sectioned perspective view showing a holographic recording medium according to a fifth embodiment.

As shown in FIG. 7, a holographic recording medium 40 of the fifth embodiment is one in which the end seal 26 of the holographic recording medium 20 shown in FIG. 5 above is replaced with an end seal 46 having an adhesive function so that it is used as an adhesive when attaching the recording layer 12 to the substrates 22 and 24.

The material of this end seal 46 is formed by dispersing the same light-absorbing material as mentioned above into a resin having an adhesive function, so that it has the function of photosensitive protection even after curing (adhesion).

Alternatively, a light-absorbing material that does not transit light in a wide range of spectrum including the wavelength $\lambda w$ of the recording beams may be used since the recording beams will not pass the end seal 46.

Next, examples of specific materials of the foregoing recording layer 12 and the photosensitive protective layer will be described.

Figure 8:
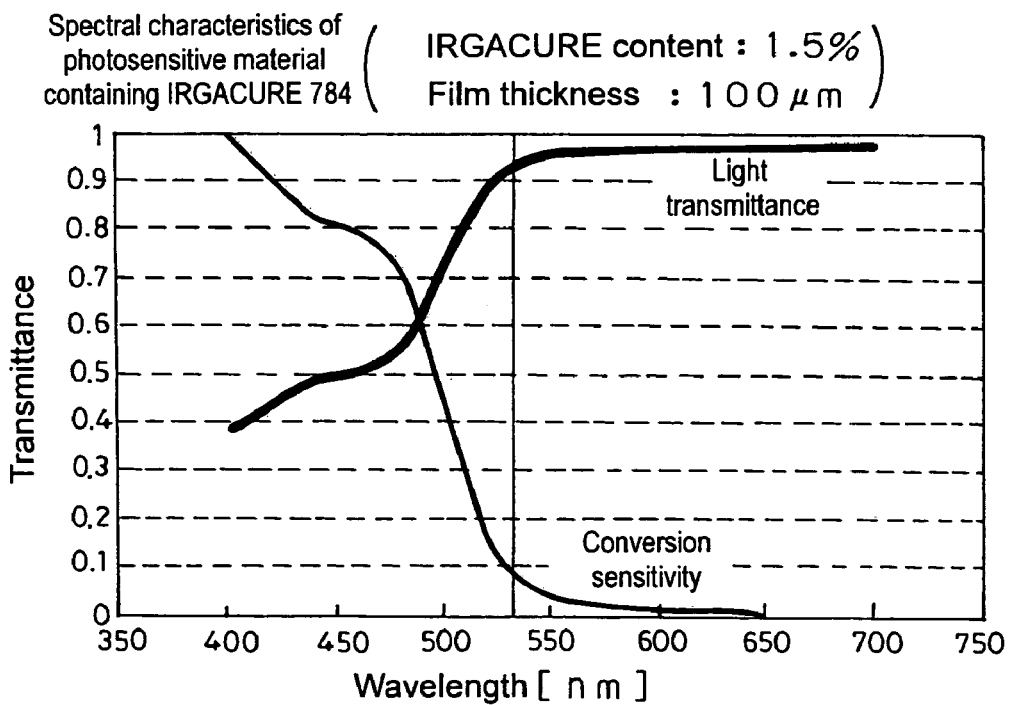
FIG. 8 is a diagram showing the light transmittance and conversion sensitivity of a specific photosensitive material to be used for the recording layer, in relation to wavelength.

FIG. 8 shows the light transmittance and conversion sensitivity when a photosensitive material having a thickness of 100 μm, containing 1.5% of IRGACURE784 from Ciba Specialty Chemicals, was used as the foregoing recording layer.

Here, when a second harmonic of Nd:YAG laser ($\lambda$=532 nm) is used for recording and reproduction, it is preferable to use a photosensitive material that contains 1.5% or so of IRGACURE 784 as a polymerization initiator (see FIG. 8).

Here, if SCF-52Y (A in FIG. 3) or SCF-50Y (B in FIG. 3) is used as the photosensitive protective layer, it is possible to block light having wavelengths shorter than 532 nm efficiently and suppress a drop in shelf life due to ambient exposure.

Figure 9:
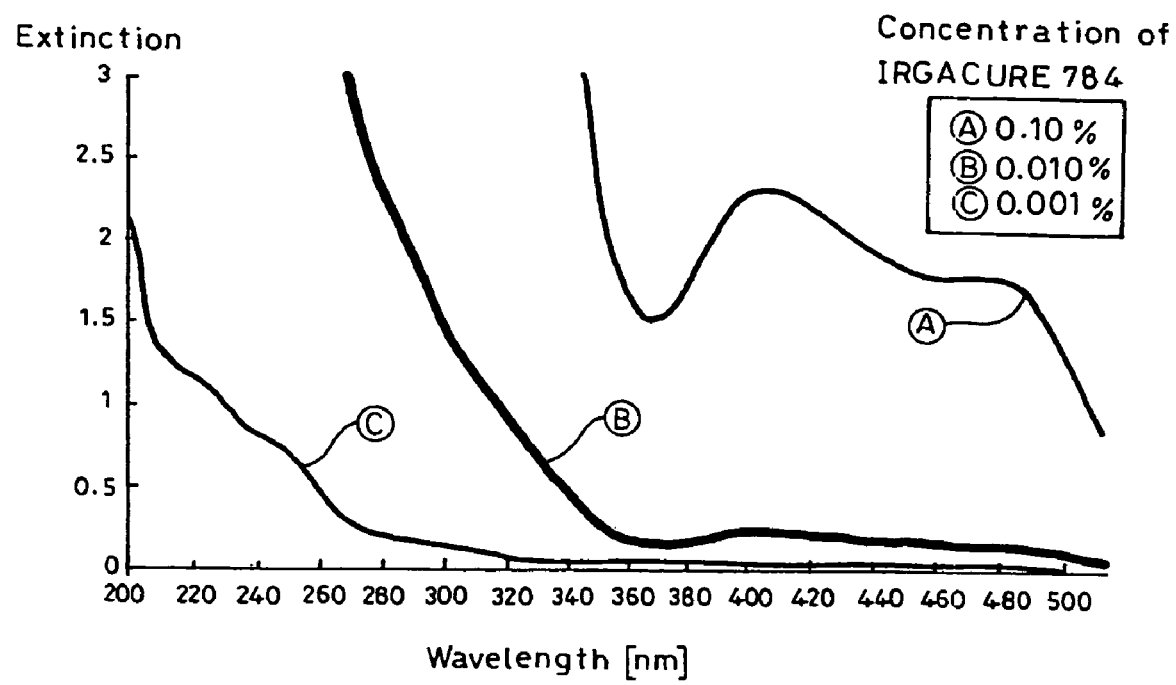
FIG. 9 is a diagram showing the extinctions of specific polymerization initiators to be used for the photosensitive protective layer, in relation to wavelength.

Moreover, FIG. 9 shows the absorbances of polymerization initiators containing 0.1%, 0.010%, and 0.001% (represented by A, B, and C) of the same IRGACURE 784 as the foregoing, in relation to wavelength.

With the absorbance of A in FIG. 9, light in the range of wavelengths shorter than the recording and reproduction wavelength $\lambda w$ is absorbed efficiently. When this polymerization initiator is used as a material of the photosensitive protective layer and combined with the photosensitive material shown in FIG. 8 to form a recording layer, it is possible to obtain such a characteristic as shown in FIG. 2.

When Ar ion laser ($\lambda$=488 nm) is used for recording and reproduction, it is preferable to use a photosensitive material that contains 0.10% of IRGACURE 784 as a polymerization initiator (A in FIG. 9). Here, if SCF-48Y (C in FIG. 3) is used as the photosensitive protective layer, it is possible to block light having wavelengths shorter than 488 nm efficiently and suppress a drop in shelf life due to ambient exposure.

INDUSTRIAL APPLICABILITY

According to the present invention, it is possible to provide a sophisticated holographic recording medium by establishing consistency between the recording sensitivity and the shelf life.

The invention claimed is:

1. A holographic recording medium comprising a recording layer, the recording layer being irradiated with an object beam and a reference beam of the same recording wavelength so that information is recorded in the form of interference fringes, wherein:
    the recording layer is covered with a photosensitive protective layer; the recording layer is formed so that photosensitivity of its material to incident light falls in the vicinity of the recording wavelength from shorter wavelengths to longer wavelengths; and the photosensitive protective layer is formed so that its light transmittance to the incident light falls in the vicinity of the recording wavelength from longer wavelengths to shorter wavelengths.

2. The holographic recording medium according to claim 1, wherein
    the photosensitive protective layer is set so that it absorbs or reflects light at least in a range of shorter wavelengths out of ranges of longer wavelengths and shorter wavelengths than a certain range of wavelengths across the recording wavelength, and transmits light in the certain range of wavelengths selectively.

3. The holographic recording medium according to claim 1, wherein
    the photosensitive protective layer is made of two substrates for sandwiching the recording layer, and an end seal for covering peripheral ends of the recording layer between the two substrates and peripheral ends of the two substrates.

4. The holographic recording medium according to claim 1, wherein
    the photosensitive protective layer is made of two substrates for sandwiching the recording layer, and an end seal for covering peripheral ends of the recording layer between the two substrates.

5. The holographic recording medium according to claim 1, wherein:
the recording layer is sandwiched between two substrates; and the photosensitive protective layer is formed to cover the recording layer and the two substrates.

6. The holographic recording medium according to claim 3, wherein
the photosensitive protective layer has an adhesive function when attaching the recording layer to the substrates, and has a light-absorbing material dispersed into its material, the light-absorbing material absorbing or reflecting light at least in the range of shorter wavelengths out of the ranges of longer wavelengths and shorter wavelengths than the certain range of wavelengths across the recording wavelength.

7. The holographic recording medium according to claim 4, wherein
the photosensitive protective layer has an adhesive function when attaching the recording layer to the substrates, and has a light-absorbing material dispersed into its material, the light-absorbing material absorbing or reflecting light at least in the range of shorter wavelengths out of the ranges of longer wavelengths and shorter wavelengths than the certain range of wavelengths across the recording wavelength.

8. The holographic recording medium according to claim 3, wherein
the two substrates are made of optical glass plates formed by dispersion, into an optical glass material, a light-absorbing material for absorbing or reflecting light at least in the range of shorter wavelengths out of the ranges of longer wavelengths and shorter wavelengths than the certain range of wavelengths across the recording wavelength, and transmitting light in the certain range of wavelengths selectively.

9. The holographic recording medium according to claim 4, wherein
the two substrates are made of optical glass plates formed by dispersion, into an optical glass material, a light-absorbing material for absorbing or reflecting light at least in the range of shorter wavelengths out of the ranges of longer wavelengths and shorter wavelengths than the certain range of wavelengths across the recording wavelength, and transmitting light in the certain range of wavelengths selectively.

10. The holographic recording medium according to claim 2, wherein
the photosensitive protective layer is made of two substrates for sandwiching the recording layer, and an end seal for covering peripheral ends of the recording layer between the two substrates and peripheral ends of the two substrates.

11. The holographic recording medium according to claim 2, wherein
the photosensitive protective layer is made of two substrates for sandwiching the recording layer, and an end seal for covering peripheral ends of the recording layer between the two substrates.

12. The holographic recording medium according to claim 10, wherein
the photosensitive protective layer has an adhesive function when attaching the recording layer to the substrates, and has a light-absorbing material dispersed into its material, the light-absorbing material absorbing or reflecting light at least in the range of shorter wavelengths out of the ranges of longer wavelengths and shorter wavelengths than the certain range of wavelengths across the recording wavelength.

13. The holographic recording medium according to claim 11, wherein
the photosensitive protective layer has an adhesive function when attaching the recording layer to the substrates, and has a light-absorbing material dispersed into its material, the light-absorbing material absorbing or reflecting light at least in the range of shorter wavelengths out of the ranges of longer wavelengths and shorter wavelengths than the certain range of wavelengths across the recording wavelength.

14. The holographic recording medium according to claim 10, wherein
the two substrates are made of optical glass plates formed by dispersion, into an optical glass material, a light-absorbing material for absorbing or reflecting light at least in the range of shorter wavelengths out of the ranges of longer wavelengths and shorter wavelengths than the certain range of wavelengths across the recording wavelength, and transmitting light in the certain range of wavelengths selectively.

15. The holographic recording medium according to claim 2, wherein: the recording layer is sandwiched between two substrates; and the photosensitive protective layer is formed to cover the recording layer and the two substrates.

16. The holographic recording medium according to claim 11, wherein the two substrates are made of optical glass plates formed by dispersion, into an optical glass material, a light absorbing material for absorbing or reflecting light at least in the range of shorter wavelengths out of the ranges of longer wavelengths and shorter wavelengths than the certain range of wavelengths across the recording wavelength, and transmitting light in the certain range of wavelengths selectively.

* * * * *